United States Patent [19]

Slonneger et al.

[11] Patent Number: 5,689,526

[45] Date of Patent: Nov. 18, 1997

[54] METHOD AND APPARATUS FOR SYNCHRONIZING A PLURALITY OF CODE DIVISION MULTIPLE ACCESS SIGNALS TO ENABLE ACQUISITION AND TRACKING BASED UPON A SINGLE PSEUDONOISE SPREADING CODE

[75] Inventors: Andrew M. Slonneger, Boynton Beach; Marco A. Mayor, Boca Raton, both of Fla.; Carl Myron Willis, Mesa, Ariz.

[73] Assignee: Motorola, Inc., Schaumburg, Ill.

[21] Appl. No.: 606,906

[22] Filed: Feb. 26, 1996

Related U.S. Application Data

[63] Continuation-in-part of Ser. No. 593,758, Jan. 29, 1996, abandoned.

[51] Int. Cl.[6] .................................................. H04B 1/707
[52] U.S. Cl. ................................................ 375/206; 370/479
[58] Field of Search .................................. 375/200, 206, 375/326, 367; 370/335, 342, 441, 479

[56] References Cited

U.S. PATENT DOCUMENTS

| | | | |
|---|---|---|---|
| 5,103,459 | 4/1992 | Gilhousen et al. | 370/342 |
| 5,166,951 | 11/1992 | Schilling | 375/200 |
| 5,467,367 | 11/1995 | Izumi et al. | 375/206 |
| 5,550,811 | 8/1996 | Kaku et al. | 370/342 |

*Primary Examiner*—Stephen Chin
*Assistant Examiner*—Jeffrey W. Gluck
*Attorney, Agent, or Firm*—R. Louis Breeden

[57] ABSTRACT

A method and apparatus at a transmitter (800) initializes (904) pseudonoise (PN) sequence generators (302, 306, 320) to predetermined initial states and thereafter generates (906) time-synchronized PN sequences. A spread spectrum signal is then transmitted (908) by utilizing the PN sequences to encode information. At a receiver (600, 700) a predetermined one of the PN sequences is acquired and tracked (1002), and one of the predetermined initial states is predicted and tracked (1004). A PN sequence generator (608, 714, 722, 730) of the receiver is adjusted (1006, 1014) to generate a selected PN sequence time-synchronized with the predetermined one, and a corresponding one of the PN sequences is despread (1008) by utilizing the selected PN sequence to decode the information.

24 Claims, 10 Drawing Sheets

100

100

400

*PRIOR ART*

500

*PRIOR ART*

600

800

700

900

1000

| Tap Feedback Configuration | | | | | | |
|---|---|---|---|---|---|---|
| time | j=0 | j=1 | j=2 | j=3 | j=4 | j=5 |
| k=0 | 37 | 37 | 37 | 37 | 37 | 37 |
| 1 | 36 | 36 | 36 | 36 | 36 | 36 |
| 2 | 34 | 34 | 35 | 35 | 35 | 34 |
| 3 | 31 | 30 | 33 | 33 | 32 | 31 |
| 4 | 23 | 21 | 27 | 26 | 24 | 22 |
| 5 | 6 | 3 | 16 | 14 | 10 | 4 |
| 6 | 15 | 6 | 34 | 31 | 21 | 11 |
| 7 | 32 | 15 | 30 | 23 | 2 | 23 |
| 8 | 24 | 33 | 21 | 7 | 4 | 6 |
| 9 | 11 | 27 | 2 | 16 | 11 | 14 |
| 10 | 22 | 16 | 5 | 34 | 22 | 30 |
| 11 | 4 | 35 | 12 | 30 | 5 | 20 |
| 12 | 10 | 32 | 25 | 20 | 12 | 1 |
| 13 | 20 | 25 | 13 | 1 | 25 | 2 |
| 14 | 1 | 12 | 26 | 3 | 13 | 5 |
| 15 | 2 | 24 | 15 | 6 | 26 | 13 |
| 16 | 5 | 10 | 32 | 15 | 14 | 26 |
| 17 | 12 | 20 | 24 | 32 | 30 | 15 |
| 18 | 25 | 1 | 10 | 25 | 20 | 32 |
| 19 | 13 | 2 | 20 | 12 | 1 | 25 |
| 20 | 27 | 4 | 1 | 24 | 3 | 12 |
| 21 | 16 | 11 | 3 | 11 | 7 | 24 |
| 22 | 35 | 22 | 6 | 22 | 16 | 10 |
| 23 | 33 | 5 | 14 | 4 | 34 | 21 |
| 24 | 26 | 13 | 31 | 10 | 31 | 3 |
| 25 | 14 | 26 | 22 | 21 | 23 | 7 |
| 26 | 30 | 14 | 4 | 2 | 6 | 16 |
| 27 | 21 | 31 | 11 | 5 | 15 | 35 |
| 28 | 3 | 23 | 23 | 13 | 33 | 33 |
| 29 | 7 | 7 | 7 | 27 | 27 | 27 |
| 30 | 17 | 17 | 17 | 17 | 17 | 17 |

*FIG. 11*

| Tap Feedback Configuration | | | | | | |
|---|---|---|---|---|---|---|
| time | j=0 | j=1 | j=2 | j=3 | j=4 | j=5 |
| k = 0 | 23 | 21 | 1 | 17 | 10 | 4 |
| 1 | 6 | 3 | 3 | 37 | 21 | 11 |
| 2 | 15 | 6 | 6 | 36 | 2 | 23 |
| 3 | 32 | 15 | 14 | 35 | 4 | 6 |
| 4 | 24 | 33 | 31 | 33 | 11 | 14 |
| 5 | 11 | 27 | 22 | 26 | 22 | 30 |
| 6 | 22 | 16 | 4 | 14 | 5 | 20 |
| 7 | 4 | 35 | 11 | 31 | 12 | 1 |
| 8 | 10 | 32 | 23 | 23 | 25 | 2 |
| 9 | 20 | 25 | 7 | 7 | 13 | 5 |
| 10 | 1 | 12 | 17 | 16 | 26 | 13 |
| 11 | 2 | 24 | 37 | 34 | 14 | 26 |
| 12 | 5 | 10 | 36 | 30 | 30 | 15 |
| 13 | 12 | 20 | 35 | 20 | 20 | 32 |
| 14 | 25 | 1 | 33 | 1 | 1 | 25 |
| 15 | 13 | 2 | 27 | 3 | 3 | 12 |
| 16 | 27 | 4 | 16 | 6 | 7 | 24 |
| 17 | 16 | 11 | 34 | 15 | 16 | 10 |
| 18 | 35 | 22 | 30 | 32 | 34 | 21 |
| 19 | 33 | 5 | 21 | 25 | 31 | 3 |
| 20 | 26 | 13 | 2 | 12 | 23 | 7 |
| 21 | 14 | 26 | 5 | 24 | 6 | 16 |
| 22 | 30 | 14 | 12 | 11 | 15 | 35 |
| 23 | 21 | 31 | 25 | 22 | 33 | 33 |
| 24 | 3 | 23 | 13 | 4 | 27 | 27 |
| 25 | 7 | 7 | 26 | 10 | 17 | 17 |
| 26 | 17 | 17 | 15 | 21 | 37 | 37 |
| 27 | 37 | 37 | 32 | 2 | 36 | 36 |
| 28 | 36 | 36 | 24 | 5 | 35 | 34 |
| 29 | 34 | 34 | 10 | 13 | 32 | 31 |
| 30 | 31 | 30 | 20 | 27 | 24 | 22 |

*FIG. 12*

| Tap Feedback Configuration | | | | | | |
|---|---|---|---|---|---|---|
| time | j=0 | j=1 | j=2 | j=3 | j=4 | j=5 |
| k = 0 | 23 | 21 | 1 | 17 | 10 | 4 |
| 1 | 6 | 3 | 3 | 37 | 21 | 11 |
| 2 | 15 | 6 | 6 | 36 | 2 | 23 |
| 3 | 32 | 15 | 14 | 35 | 4 | 6 |
| 4 | 24 | 33 | 31 | 33 | 11 | 14 |
| 5 | 11 | 27 | 22 | 26 | 22 | 30 |
| 6 | 22 | 16 | 4 | 14 | 5 | 20 |
| 7 | 4 | 35 | 11 | 31 | 12 | 1 |
| 8 | 10 | 32 | 23 | 23 | 25 | 2 |
| 9 | 20 | 25 | 7 | 7 | 13 | 5 |
| 10 | 1 | 12 | 17 | 16 | 26 | 13 |
| 11 | 2 | 24 | 37 | 34 | 14 | 26 |
| 12 | 5 | 10 | 36 | 30 | 30 | 15 |
| 13 | 12 | 20 | 35 | 20 | 20 | 32 |
| 14 | 25 | 1 | 33 | 1 | 1 | 25 |
| 15 | 13 | 2 | 27 | 3 | 3 | 12 |
| 16 | 27 | 4 | 16 | 6 | 7 | 24 |
| 17 | 16 | 11 | 34 | 15 | 16 | 10 |
| 18 | 35 | 22 | 30 | 32 | 34 | 21 |
| 19 | 33 | 5 | 21 | 25 | 31 | 3 |
| 20 | 26 | 13 | 2 | 12 | 23 | 7 |
| 21 | 14 | 26 | 5 | 24 | 6 | 16 |
| 22 | 30 | 14 | 12 | 11 | 15 | 35 |
| 23 | 21 | 31 | 25 | 22 | 33 | 33 |
| 24 | 3 | 23 | 13 | 4 | 27 | 27 |
| 25 | 7 | 7 | 26 | 10 | 17 | 17 |
| 26 | 17 | 17 | 15 | 21 | 37 | 37 |
| 27 | 37 | 37 | 32 | 2 | 36 | 36 |
| 28 | 36 | 36 | 24 | 5 | 35 | 34 |
| 29 | 34 | 34 | 10 | 13 | 32 | 31 |
| 30 | 31 | 30 | 20 | 27 | 24 | 22 |

*FIG. 13*

METHOD AND APPARATUS FOR SYNCHRONIZING A PLURALITY OF CODE DIVISION MULTIPLE ACCESS SIGNALS TO ENABLE ACQUISITION AND TRACKING BASED UPON A SINGLE PSEUDONOISE SPREADING CODE

This application is a continuation-in-part of Ser. No. 08/593,758 filed Jan. 29, 1996, abandoned, by Slonneger et al., entitled "Method and Apparatus for Transmitting and Receiving Information in a Spread Spectrum Signal."

FIELD OF THE INVENTION

This invention relates in general to communication systems, and more specifically to a method and apparatus for transmitting and receiving information in a spread spectrum signal.

BACKGROUND OF THE INVENTION

Modern data communication systems are evolving to higher bandwidths as the need for information throughput increases. A common manner of achieving higher bandwidth is to utilize parallel channels for transmitting the information. In a system using spread spectrum techniques, for example, more than one pseudonoise (PN) sequence can be generated and used for modulating more than one information data stream, thereby creating multiple parallel channels for the information transmitted via a single radio transmitter.

Prior art receivers for spread spectrum signals transmitted in multiple parallel channels have required corresponding multiple acquisition and tracking loops for despreading the multiple PN sequences to decode the information. The multiple acquisition and tracking loops have added significantly to the cost of the prior art receivers.

Thus, what is needed is a method and apparatus for transmitting and receiving information in a multi-channel spread spectrum signal which does not require the expensive multiple acquisition and tracking loops. A method and apparatus is needed that can decode multiple parallel channels by utilizing only a single acquisition and tracking loop.

SUMMARY OF THE INVENTION

An aspect of the present invention is a method for transmitting and receiving information in a spread spectrum signal in a data communication system. The method comprises at a transmitter the steps of initializing a plurality of pseudonoise (PN) sequence generators to a plurality of predetermined initial states, thereafter generating a plurality of transmit PN sequences that are time-synchronized with one another by the plurality of PN sequence generators, and transmitting the spread spectrum signal by utilizing the plurality of transmit PN sequences to encode the information. The method further comprises at a receiver the steps of acquiring and tracking a predetermined one of the plurality of transmit PN sequences, and predicting and tracking a selected one of the plurality of predetermined initial states. The method further comprises at the receiver the steps of adjusting a PN sequence generator to generate a selected PN sequence corresponding to one of the plurality of transmit PN sequences and time-synchronized with the predetermined one of the plurality of transmit PN sequences, and despreading the corresponding one of the plurality of transmit PN sequences by utilizing the selected PN sequence to decode the information.

Another aspect of the present invention is a transmitter for transmitting information as a spread spectrum signal in a data communication system. The transmitter comprises an input interface for receiving a message including the information to be transmitted, and a processor coupled to the input interface for processing the information. The transmitter further comprises a plurality of pseudonoise (PN) sequence generators coupled to the processor for being initialized thereby to a plurality of predetermined initial states. The processor controls the plurality of PN sequence generators to generate a plurality of transmit PN sequences that are time-synchronized with one another. The transmitter also includes at least one radio frequency (RF) modulator for transmitting the spread spectrum signal after the plurality of transmit PN sequences are utilized to encode the information.

Another aspect of the present invention is a receiver for receiving information in a spread spectrum signal in a data communication system. The receiver comprises an acquisition and tracking element for acquiring and tracking a predetermined one of a plurality of transmit PN sequences that are time-synchronized with one another, and a processor coupled to the acquisition and tracking element for predicting and tracking one of a plurality of predetermined initial states and for adjusting a PN sequence generator to generate a selected PN sequence corresponding to one of the plurality of transmit PN sequences other than the predetermined one and time-synchronized with the predetermined one. The receiver further comprises the PN sequence generator coupled to the processor for despreading the corresponding one of the plurality of transmit PN sequences by utilizing the selected PN sequence to decode the information.

Another aspect of the present invention is a receiver for receiving information in a spread spectrum signal in a data communication system. The receiver comprises an acquisition and tracking element for acquiring and tracking a predetermined one of a plurality of transmit PN sequences that are time-synchronized with one another, and a processor coupled to the acquisition and tracking element for predicting and tracking one of a plurality of predetermined initial states and for adjusting a plurality of PN sequence generators to simultaneously generate a plurality of selected PN sequences corresponding to ones of the plurality of transmit PN sequences and time-synchronized with the predetermined one. The receiver further comprises the plurality of PN sequence generators coupled to the processor for simultaneously despreading the corresponding ones of the plurality of transmit PN sequences by utilizing the plurality of selected PN sequences to decode the information.

BRIEF DESCRIPTION OF THE DRAWINGS

FIGS. 11–13 are tables depicting arrangements of m-sequences utilized in accordance with the present invention.

DETAILED DESCRIPTION OF THE DRAWINGS

Described herein below is a cost effective implementation for the transmission and reception of multiple time-synchronized pseudonoise (PN) sequences in a spread spectrum communication system. Two receiver implementations are described that can be used to receive the multiple time-synchronized PN sequences. Prior art spread spectrum receivers have required a dedicated channel to despread each spread spectrum signal. Each spread spectrum signal had to be acquired and tracked separately to successfully despread the signal. The approach described below in accordance with the present invention only requires the acquisition and tracking of a single one of the time-synchronized PN sequences to despread the remaining PN sequences. This approach reduces the complexity of the receiver required to receive two or more spread spectrum signals simultaneously and therefore provides a cost effective implementation.

Figure 1:
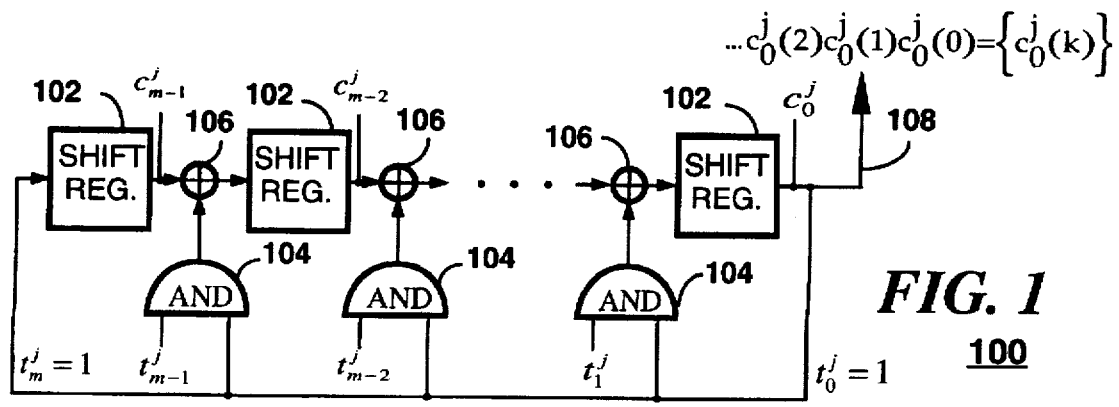
FIG. 1 is an electrical block diagram of a modular shift register in accordance with the present invention.

FIG. 1 is an electrical block diagram of a modular shift register 100 in accordance with the present invention. To simplify the diagram, clock and other control signals well known to one of ordinary skill in the art have been omitted. The modular shift register 100 preferably comprises a plurality of conventional one-bit shift registers 102, coupled to one another through conventional exclusive-OR (XOR) logic circuits 106. A second input of each of the XOR logic circuits 106 is coupled to the output of one of a plurality of conventional two-input AND gates 104. A first input of each of the plurality of AND gates 104 is coupled to the output 108 of the modular shift register 100. A second input of each of the plurality of AND gates 104 is coupled to a value stored in a conventional register (not shown) that represents a tap (discussed further below), which controls the feedback configuration of the modular shift register 100. The modular shift register 100 is configured for generating maximal length linear shift register sequences (or more simply, m-sequences) in a manner well known to one of ordinary skill in the art. It will be appreciated that, alternatively, a simple, continuous shift register type of implementation can also be used to generate m-sequences for this invention. However, since the latter implementation is less time efficient, the modular approach is preferred. Further information on the generation and utilization of m-sequences for spread spectrum communications is available, for example, in *Modern Communications and Spread Spectrum* by George R. Cooper and Clare D. McGillem, pp. 289–305 and 326–331, McGraw-Hill, Inc., 1986.

The parameters $t^j_0, t^j_1, \ldots, t^j_m$ are referred to as taps and represent the feedback configuration for the generator. At time k, the contents of the m shift registers are denoted $c^j_0(k), c^j_1(k), \ldots, c^j_{m-1}(k)$ from right to left, respectively. At the next time k+1, the shift register contents are given by $$c^j_i(k+1) = \begin{cases} c^j_{i+1}(k) \oplus (t^j_{i+1} \cdot c^j_0(k)) & \text{for } i = 0, 1, \ldots, m-2 \\ c^j_0(k) & \text{for } i = m-1 \end{cases}$$

for j=0,1, ... N−1 and k=1,2, ..., given the initial conditions $c^j_i(0)$, i=0,1, ... ,m−1. (N represents the maximum possible number of m-sequences for a given generator size, and will be defined herein below.) By defining $c^j_m = 0$, the above expression can be written more compactly as $$c^j_i(k+1) = c^j_{i+1}(k) \oplus (t^j_{i+1} \cdot c^j_0(k)) \text{ for } i=0, 1, \ldots, m-1$$

For simplicity, the following unsigned integers are defined $$c^j(k) = c^j_{m-1}(k)c^j_{m-2}(k) \ldots c^j_0(k) \text{ in binary for } k=0,1, \ldots, \text{ and}$$

$$t^j = t^j_m t^j_{m-1} \ldots t^j_0 \text{ in binary.}$$

One period of the m-sequence is given by $$c^j_0(2^m-2), c^j_0(2^m-3), \ldots, c^j_0(1), c^j_0(0). \text{ Hence, let } \{c^j_0(k)\}$$

denote the $j^{th}$ m-sequence of the system.

A sequence with order m has period $L=2^m-1$ and is said to be an m-sequence with thee conditions that the m bit integer $c^j(0)$ is nonzero and that the bits of the m+1 bits integer $t^j$ correspond to an irreducible mth-degree polynomial having coefficients of either zero or one. There are N such integers where $t^j$, j=0, 1, ... N−1, N=1/m $\phi(2^m-1)$ and $\phi(k)$ is the number of integers less than k and relatively prime to k. For a given set of taps, $t^j$, different initial conditions will produce shifted versions of the same m-sequence.

Figure 2:
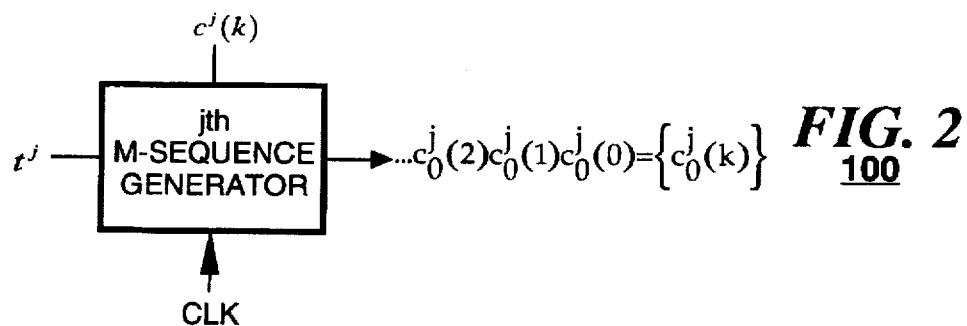
FIG. 2 is a condensed representation of the modular shift register of FIG. 1.

FIG. 2 is a condensed representation of the modular shift register 100. A terminal (CLK) for inputting a clock signal is depicted in FIG. 2 for use in time synchronizing a plurality of the modular shift registers 100 with one another.

Figure 3:
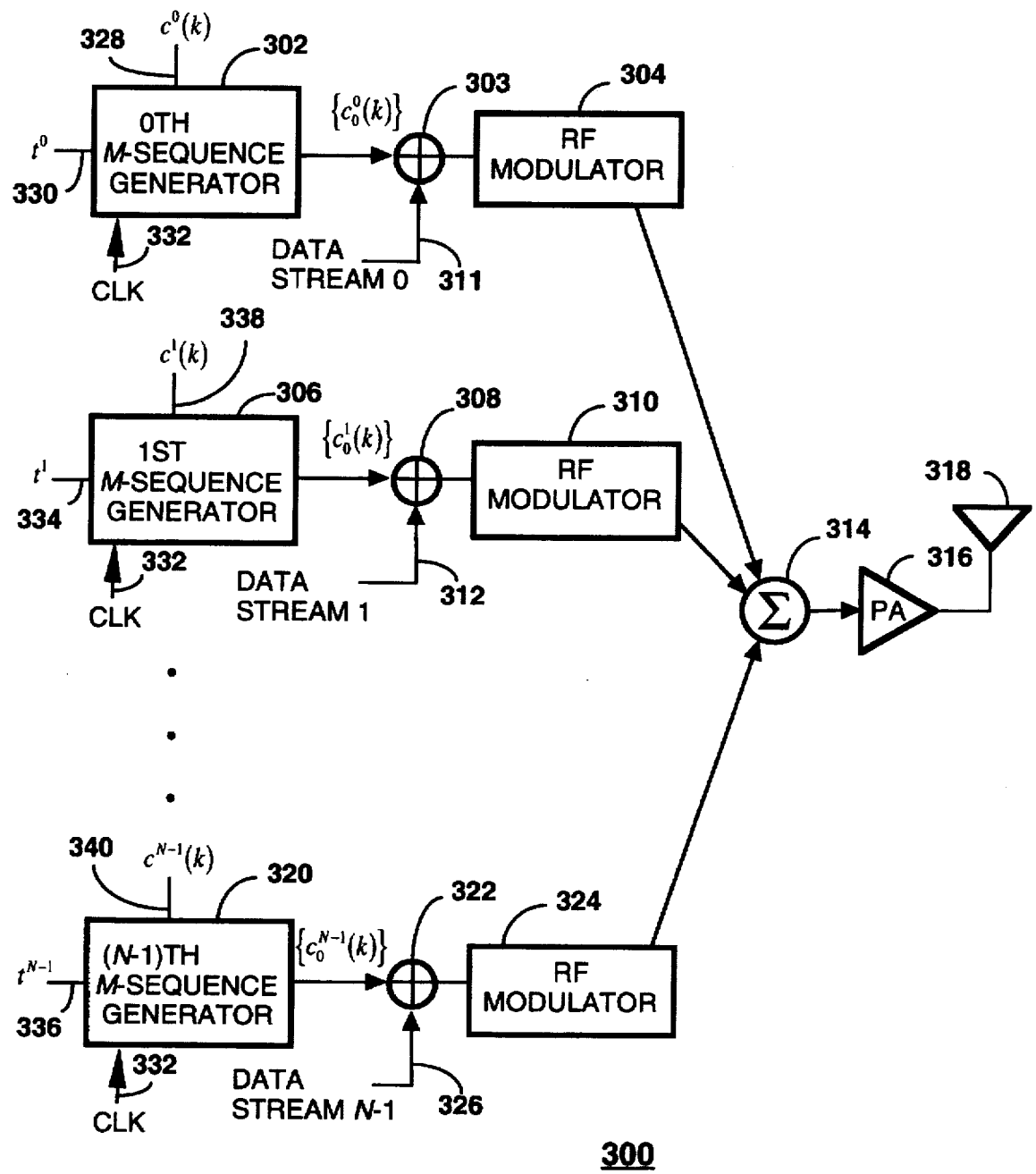
FIG. 3 is an electrical block diagram of a back end of a spread spectrum transmitter in accordance with the present invention.

FIG. 3 is an electrical block diagram of a spread spectrum transmitter back end 300 in accordance with the preferred embodiment of the present invention. The transmitter back end 300 comprises a 0th m-sequence generator 302 having a 0th initialization bus 328 for initializing the contents of the shift registers 102 with a 0th set of initial values. The 0th m-sequence generator 302 also includes a 0th tap bus 330 for receiving a 0th set of tap values for defying the m-sequence to be generated by the generator 302, and a clock bus 332 for receiving a clock signal. The generator 302 is coupled to a first input of an XOR logic circuit 303, a second input of which is coupled to a 0th data stream bus 311. The output of the XOR logic circuit 303 is coupled to a conventional radio frequency (RF) modulator 304 for generating a spread spectrum radio signal. Alternatively, as an option the transmitter back end 300 can omit the XOR logic circuit 303 and the 0th data stream. This option allows the transmitter back end 300 to send the 0th m-sequence without modulation by any data stream, thereby facilitating acquisition and tracking of the 0th m-sequence in a receiver, as discussed further herein below.

The transmitter back end 300 further comprises a 1st m-sequence generator 306 having a 1st initialization bus 338 for initializing the contents of the shift registers 102 with a 1st set of initial values. The 1st m-sequence generator 306 also includes a 1st tap bus 334 for receiving a 1st set of tap values for defining the m-sequence to be generated by the generator 306, and the clock bus 332 for receiving the clock signal. The generator 306 is coupled to a first input of an XOR logic circuit 308, a second input of which is coupled to a 1st data stream bus 312. The output of the XOR logic circuit 308 is coupled to a conventional RF modulator 310 for generating a spread spectrum radio signal comprising the first data stream spread by the 1st m-sequence.

In addition, the transmitter back end 300 can further comprise additional generators and modulators, up to an (N−1)th m-sequence generator 320 having an (N−1)th initialization bus 340 for initializing the contents of the shift registers 102 with an (N−1)th set of initial values. (N is the same N as on the preceding page, and represents the maximum number of usable tap configurations $t^j$, i.e., those tap configurations meeting the conditions specified on the preceding page). The (N−1)th m-sequence generator 320 also includes an (N−1)th tap bus 336 for receiving an (N−1)th set of tap values for defining the m-sequence to be generated by the generator 320, and the clock bus 332 for receiving the clock signal. The generator 320 is coupled to a first input of an XOR logic circuit 322, a second input of which is coupled to an (N−1)th data stream bus 326. The output of the XOR logic circuit 322 is coupled to a conventional RF modulator 324 for generating a spread spectrum radio signal comprising the (N−1)th data stream spread by the (N−1)th m-sequence.

The outputs of the RF modulators 304, 310, 324 are summed in a conventional summer 314, which is coupled to a conventional power amplifier 316 and antenna 318 for transmitting the spread spectrum signals. The spread spectrum transmitter back end 300 satisfies the preferred embodiment of this invention with the condition that all of the m-sequences have the m bit integer $c^j(0)$ in common, i.e., $c^0(0)=c^1(0)=\ldots=c^{N-1}(0)$. Subsequently, by the properties of m-sequences, $c^0(h\cdot L)=c^1(h\cdot L)=\ldots=c^{N-1}(h\cdot L)$ for h=0,1, ..., (i.e., the value of $c^j(h\cdot L)$ is independent of j). The spread spectrum transmitter back end 300 thus transmits multiple time-synchronized spread spectrum signals.

In an alternative embodiment in accordance with the present invention, all of the m-sequences of the transmitter back end 300 do not have the m bit integer $c^j(0)$ in common. At a cost of slightly increased complexity, some or all of the m bit integers $c^j(0)$ can differ from one another. In the alternative embodiment, the initial conditions for each of the m-sequence generators 302, 306, 320 are known by the receiver, so that the relative positions of the m-sequences can be replicated in the receiver. Possible advantages and disadvantages of the alternative embodiment will be discussed further below.

In the spread spectrum transmitter back end 300, the $0^{th}$ m-sequence preferably is not modulated with data. This absence of data is not absolutely required, but acquisition of an m-sequence when no data is present is less complex, and thus advantageously faster. In addition, a selection of the value of the m bit integer $c^0(0)$ can be made (e.g., through computer simulations) to minimize the magnitude of the cross correlation averaged over every pair of m-sequences. There are N(N−1)/2 of these pairs of m-sequences. The above described selection is preferred, but is not absolutely required in accordance with the present invention.

Figure 4:
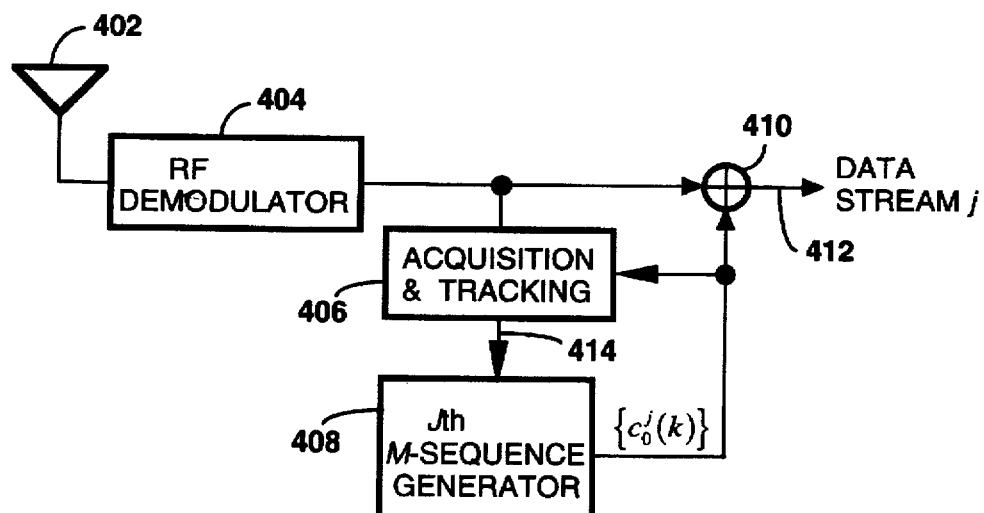
FIG. 4 is an electrical block diagram of a prior art serial spread spectrum receiver.

To decode multiple spread spectrum signals, a conventional receiver must acquire and track each PN sequence to decode the corresponding data. A prior art serial spread spectrum receiver 400, as shown in FIG. 4 comprises an antenna 402 for intercepting the multiple spread spectrum signals. The antenna 402 is coupled to an RF demodulator 404 for demodulating the multiple spread spectrum signals. The demodulator 404 is coupled to an acquisition and tracking element 406 coupled through a control bus 414 to a jth m-sequence generator 408 for cooperating therewith to acquire and track one of the multiple spread spectrum signals. The receiver 400 cannot decode more than one data stream at a time. Furthermore, in order to decode a different data stream, the receiver 400 must acquire and track the corresponding m-sequence, which takes time.

Figure 5:
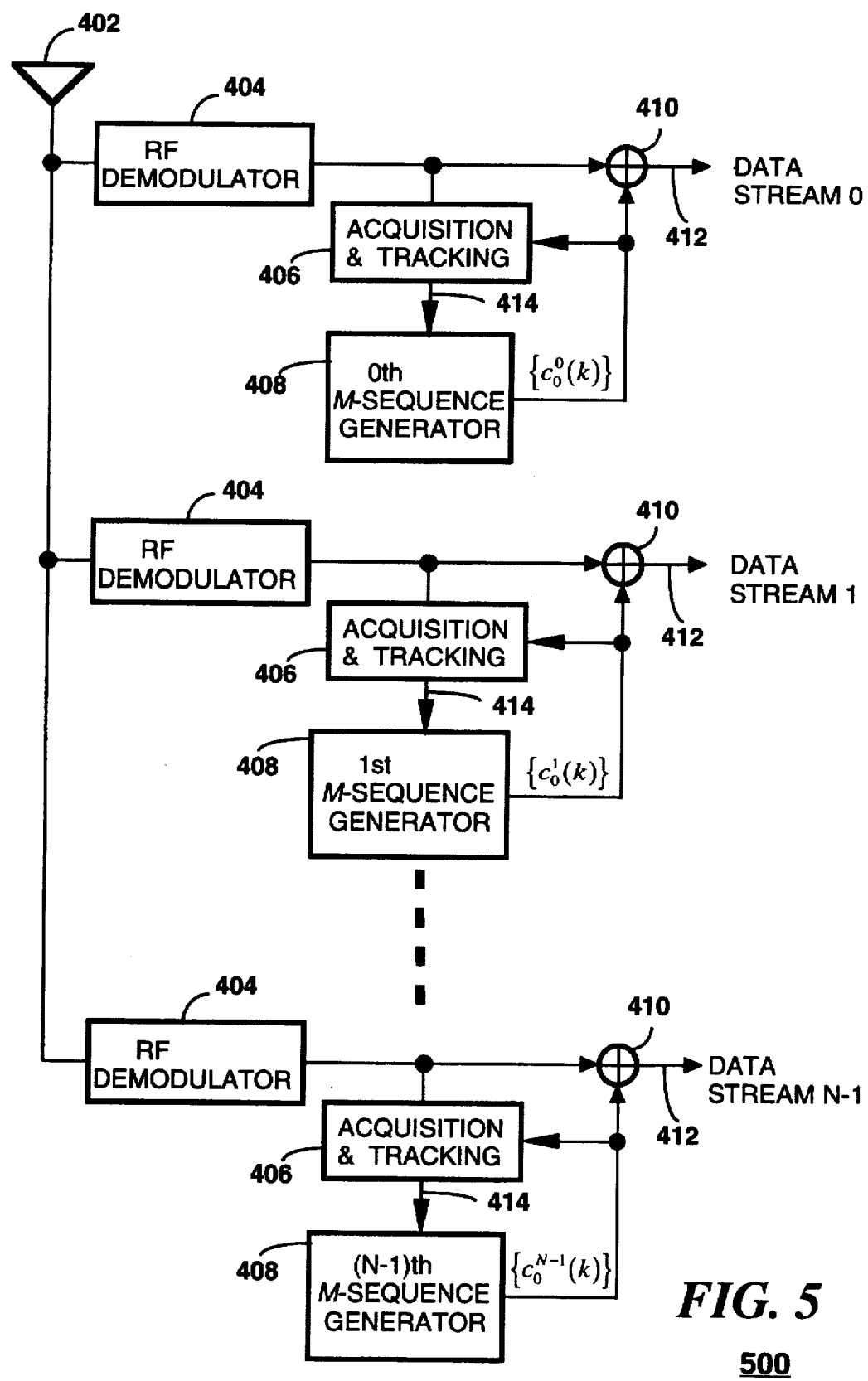
FIG. 5 is an electrical block diagram of a prior art parallel spread spectrum receiver.

A prior art parallel spread spectrum receiver 500, as depicted in FIG. 5, can decode multiple spread spectrum signals simultaneously, but requires multiple acquisition and tracking elements 406 and multiple m-sequence generators 408. The additional hardware required by a parallel implementation will significantly increase the cost of the receiver 500.

Figure 6:
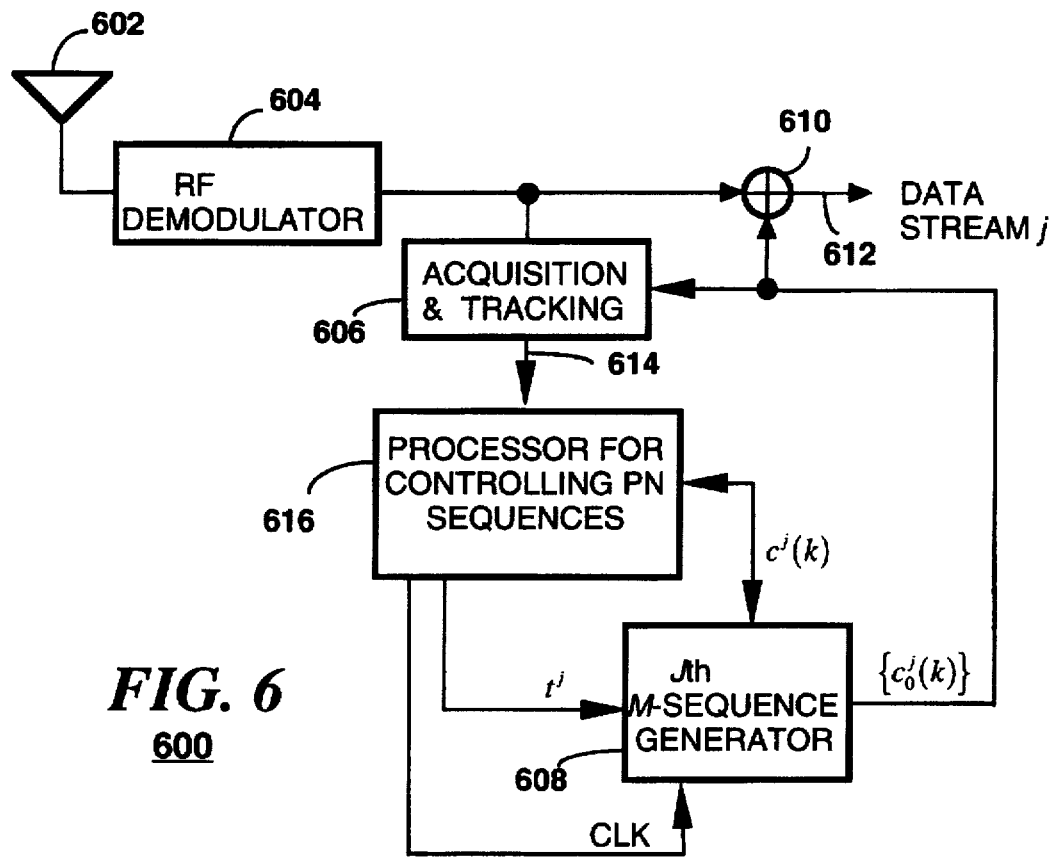
FIG. 6 is an electrical block diagram of a first embodiment of a spread spectrum communication receiver in accordance with the present invention.

FIG. 6 is an electrical block diagram of a first embodiment of a spread spectrum communication receiver 600 in accordance with the present invention. The receiver 600 comprises a conventional antenna 602 coupled to a conventional RF demodulator 604 for intercepting and demodulating the multiple spread spectrum signals. The demodulator 604 is coupled to a conventional acquisition and tracking element 606, which is coupled by a control bus 614 to a processor 616 for controlling the pseudonoise (PN) sequences generated by a jth m-sequence generator 608 in accordance with the present invention. The generator 608 is coupled to the acquisition and tracking element 606 for providing an m-sequence to compare to the demodulated signals. The processor 616 cooperates with the acquisition and tracking element 606 and the jth m-sequence generator 608 to acquire and track any one of the multiple spread spectrum signals. This is accomplished by acquiring and tracking a predetermined one of the m-sequences and then, coincident with the occurrence of the predetermined initial state of the generator 608, adjusting the taps of the generator 608 to generate any desired PN sequence. The generator 608 is further coupled to a first input of an XOR logic element 610, the second input of which is coupled to the RF demodulator for receiving the multiple spread spectrum signals. The XOR logic element 610 despreads the encoded data stream that corresponds to the m-sequence generated by the generator 608 to produce the corresponding data stream at an output 612.

In the alternative embodiment in accordance with the present invention, in which all of the m-sequences of the transmitter back end 300 do not have the m bit integer $c^j(0)$ in common, some m-sequence arrangements require adjusting not only the taps of the generator 608 coincident with the occurrence of the predetermined initial state, but also reloading the initial conditions corresponding to the m-sequence to be generated next. Alternatively, by judiciously picking the initial conditions for the transmitted m sequences, it is possible to arrange for any two m-sequences to have a common set of states in the generator 608 at one or more identical points in the sequence, even though the initial conditions of the two m-sequences are different. In the latter case, only the taps of the generator 608 need be adjusted if the adjustment is made coincident with the point at which the two m-sequences have the common set of states. In addition, the ability to change the m-sequences more frequently than once per period of the 0th m-sequence (without additional calculations) can be advantageous in, for example, a secure system that transmits data in short bursts encoded with different m-sequences. Various arrangements of the m-sequences in accordance with the alternative embodiment will be further discussed in conjunction with FIGS. 11–13.

Figure 7:
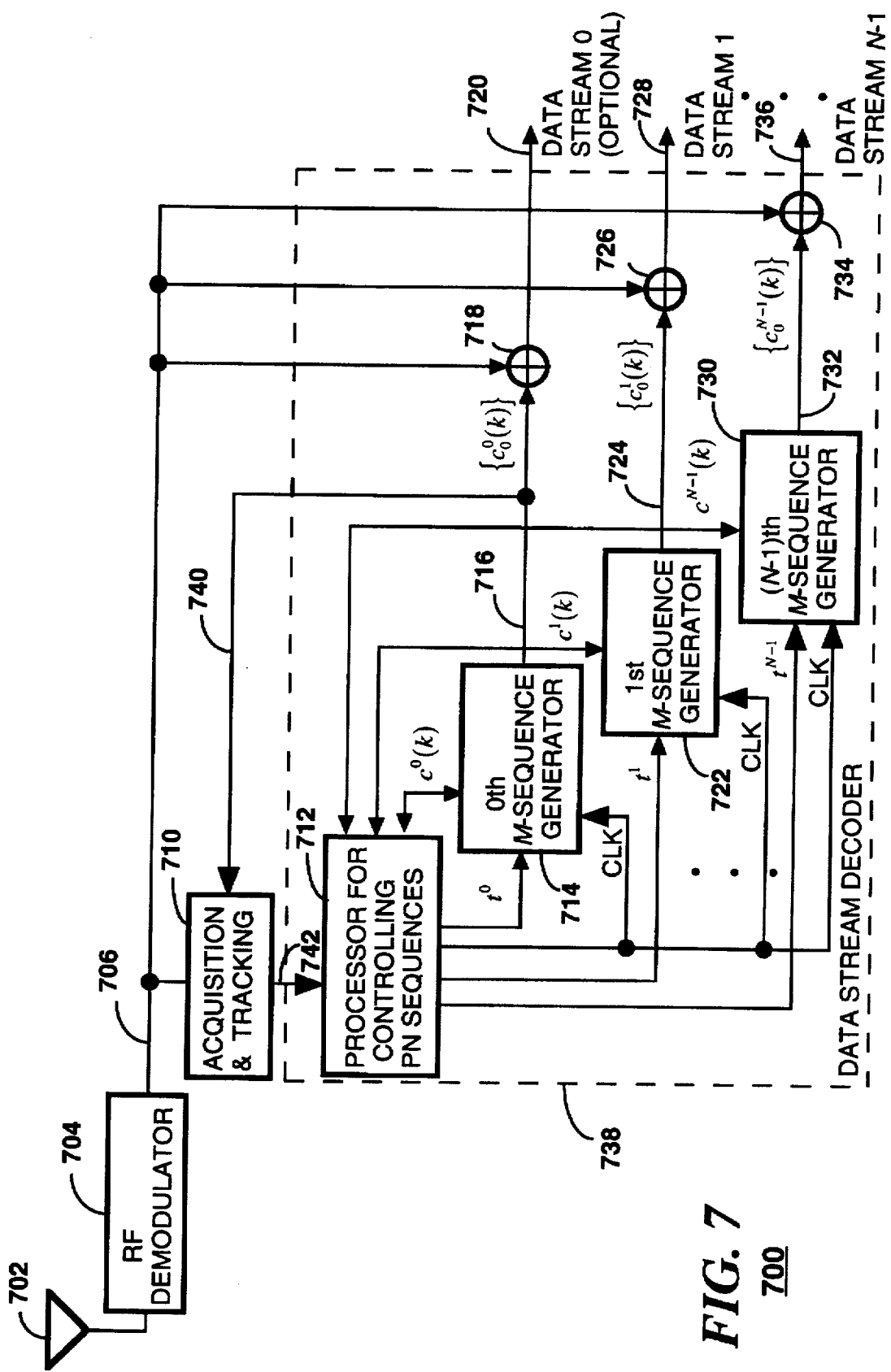
FIG. 7 is an electrical block diagram of a second embodiment of a spread spectrum communication receiver in accordance with the present invention.

FIG. 7 is an electrical block diagram of a second embodiment of a spread spectrum communication receiver 700 in accordance with the present invention. The receiver 700 has the simplicity of the prior art serial approach along with the speed of the prior art parallel approach. The receiver 700 comprises an antenna 702 and a conventional demodulator 704 for intercepting and demodulating the multiple time-synchronized spread spectrum signals. The demodulator output 706 is coupled to a conventional acquisition and tracking element 710 for acquiring and tracking preferably the 0th m-sequence. The acquisition and tracking element 710 is coupled by a control bus 742 to a processor 712 for controlling the PN sequences generated by a plurality of m-sequence generators 714, 722, 730. The m-sequences are time-synchronized with one another via a common clock signal (CLK) provided by the processor 712.

Preferably, the output 716 of the 0th m-sequence generator 714 is coupled to the acquisition and tracking element 710 for providing the 0th m-sequence to compare to the demodulated signals. First inputs of a plurality of XOR logic elements 718, 726, 734 are coupled to the outputs 716, 724, 732 of the generators 714, 722, 730, respectively. Second inputs of the plurality of XOR logic elements 718, 726, 734 are coupled to the demodulator output 706. The outputs 720, 728, 736 of the plurality of XOR logic elements 718, 726, 734 simultaneously produce the multiple despread data streams. It should be noted that for systems which do not modulate the 0th m-sequence with a data stream, the XOR logic element 718 and the output 720 for the 0th data stream can be omitted. It will be appreciated by one of ordinary skill in the art that, alternatively, elements of the data stream decoder 738 (depicted in the dashed box) can be realized either in a digital signal processor such as the model DSP56100 processor, manufactured by Motorola, Inc. of Schaumburg Ill., or as an application specific integrated circuit (ASIC). While the receiver 700 is depicted as having all N possible m-sequence generators 714, 722, 730, it will be appreciated that the number of m-sequence generators 714, 722, 730 in the receiver 700 can be less than N if it is not desired to despread all N possible m-sequences simultaneously.

In somewhat more operational detail, the receivers 600, 700 preferably first acquire $\{c^0_0(k)\}$, that is, the m-sequence with no data, by choosing the feedback configuration corresponding to $t^0$. Alternatively, in the more general setting where data modulates all of the m-sequences, the receivers 600, 700 can acquire whichever sequence is designated to be first.

Once this initial acquisition is complete, data can be demodulated from any of the m-sequences by changing the feedback configuration of the locally generated replica of the m-sequence. Acquisition of subsequent m-sequences is not necessary due to the constraint at the transmitter back end 300 that requires all of the m-sequences to have the same initial condition.

Initially, the locally generated m-sequence has the feedback configuration corresponding to $t^j=t^0$ in order to acquire $\{c^0_0(k)\}$. As soon as $\{c^0_0(k)\}$ is acquired, $c^j(k)$ is monitored until $c^j(k)=c^0(0)$ (i.e., until the shift register states represent the initial condition). Once $c^j(k)=c^0(0)$, the taps $t^j$ can be changed to $t^{j_1}$ for some $j_1\in\{1,2,\ldots,N-1\}$. The parameter $j_1$ corresponds to the m-sequence that the receiver 600, 700 should despread next. The data retrieved from this m-sequence can contain any information including the next value of $j_n$ to use when $c^j(k)=c^0(0)$ again. The feedback configuration, of course, does not have to change every period.

In a practical system, monitoring $c^j(k)$ until $c^j(k)=c^0(0)$ may not leave enough time to change $t^j$ and properly decode the desired data stream. This problem is easily solved by monitoring $c^j(k)$ until $c^j(k)=c^0(hL-a)$ where a and h are positive integers. The parameter a represents a sufficient length of time to allow $t^j$ to take on its next value by the time $c^j(k)=c^0(hL)=c^0(0)$.

In general, consider the case where the taps are set to $t^j=t^{j^n}$ implying that data stream $j_n$ is being decoded ($j_n \neq 0$). Assume the next desired data stream is $j_{n+1}$. The taps $t^j$ should be changed to $t^j=t^{j^{n+1}}$ when $c^j(k)=c^0(0)$. With prediction, when $c^j(k)=c^{j^n}(hL-a)$, it is known that at time a later, $c^j(k)=c^{j^n}(k)=c^{j^n}(hL)=c^0(0)$. Given a, the value $c^{j^n}(hL-a)$ depends on $t^{j^n}$ and $c^0(0)$, and is not in general equal to $c^0(hL-a)$.

Alternatively, in a system where waiting until $c^j(k)=c^0(hL)=c^0(0)$ to change data streams is an unacceptable delay, the taps $t^j=t^{j^n}$ can be changed to $t^j=t^{j^{n+1}}$ at any time hL+b, where b and h are positive integers, as long as the contents of the shift registers, $c^j(hL+b)=c^{j^n}(hL+b)$, are changed to $c^j(hL+b)=c^{j^{n+1}}(hL+b)$ at the same time. The values $c^{j^{n+1}}(hL+b)$ can be found recursively by using the fact that $c^{j^{n+1}}_i(hL)=c^0_i(0)$ and $$c^{j^{n+1}}_i(hL+b) = \begin{cases} c^{j^{n+1}}_{i+1}(hL+b-1) \oplus (t^{j^{n+1}}_{i+1} \cdot c^{j^{n+1}}_0(hL+b-1)) & \text{for } i=0,1,\ldots,m-2 \\ c^{j^{n+1}}_0(hL+b-1) & \text{for } i=m-1. \end{cases}$$

If b>L/2, it takes less computation to use the fact that $c^{j^{n+1}}_i(hL+L)=c^0_i(0)$ and $$c^{j^{n+1}}_{i+1}(hL+b) = \begin{cases} c^{j^{n+1}}_i(hL+b+1) \oplus (t^{j^{n+1}}_{i+1} \cdot c^{j^{n+1}}_{m-1}(hL+b+1)) & \text{for } i=1,2,\ldots,m-1 \\ c^{j^{n+1}}_0(hL+b-1) & \text{for } i=0. \end{cases}$$

More generally, in the embodiment in which the m-sequences are not required to have the same initial condition, the calculations shown above can still be used with the fact that $c^{j^{n+1}}_i(hL)$ and $c^{j^{n+1}}_i(hL+L)$ are known, but in general are not equal to $jc^0_i(0)$.

It will be appreciated that if the receiver 700 comprises N generators 714, 722, 730 for generating all possible m-sequences, once the taps have been adjusted to synchronize the generators 714, 722, 730, no further adjustment will be necessary. It will be further appreciated that, alternatively, if the receiver 700 has N generators, the taps can be preprogrammed, and the generator clocks for all except the 0th generator 714 held disabled until detection of the predetermined initial condition, to synchronize the generators 714, 722, 730.

It will be further appreciated that in the alternative embodiment in which all of the m-sequences of the transmitter back end 300 do not have the m bit integer $c^i(0)$ in common, with some m-sequence arrangements it is required to adjust not only the taps of the generators 714, 722, 730 coincident with the occurrence of the predetermined initial state, but also to reload the initial conditions corresponding to the m-sequence to be generated next. Alternatively, by judiciously picking the initial conditions for the transmitted m-sequences, it is possible to arrange for any two m-sequences to have a common set of states in the generators 714, 722, 730 at one or more identical points in the sequence, even though the initial conditions of the two m-sequences are different. In the latter case, only the taps of the generators 714, 722, 730 need be adjusted if the adjustment is made coincident with the point at which the two m-sequences have the common set of states.

Figure 8:
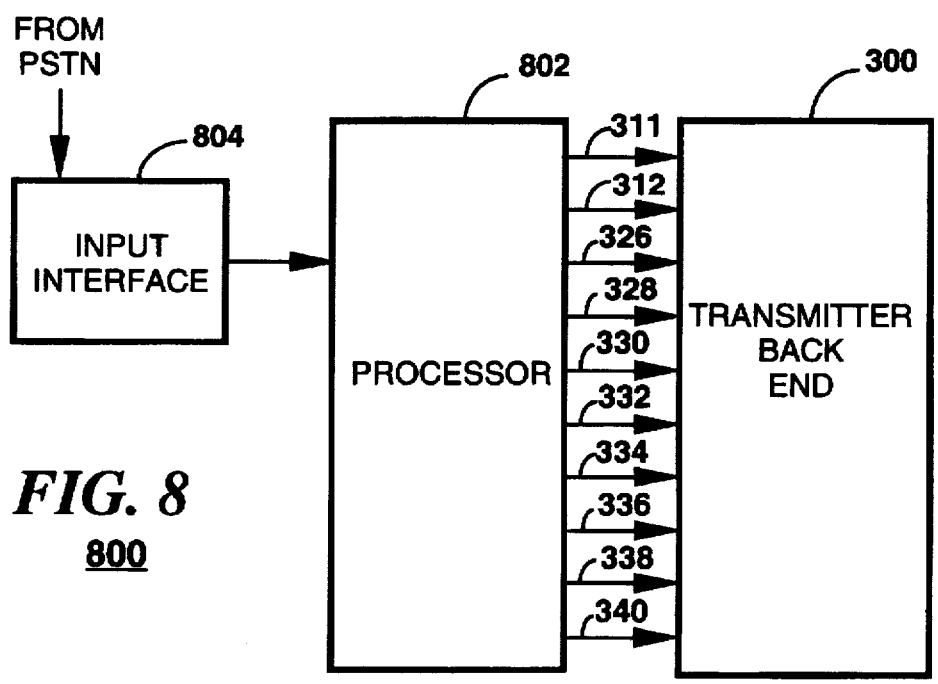
FIG. 8 is an electrical block diagram of the spread spectrum transmitter in accordance with the present invention.

FIG. 8 is an electrical block diagram of a spread spectrum transmitter 800 in accordance with the present invention. The transmitter 800 comprises an input interface 804 coupled, for example, to a public switched telephone network (PSTN) for receiving messages comprising information to be communicated by the transmitter 800. The transmitter 800 further comprises a conventional processor 802 coupled to the input interface for processing the information. The transmitter 800 further comprises the transmitter back end 300 for transmitting the information as multiple time-synchronized spread spectrum signals in accordance with the present invention. The processor 802 is programmed to control the transmitter back end 300 in accordance with the present invention. The transmitter back end 300 is coupled to the processor 802 by buses 311, 312, and 326–340 for controlling the transmitter back end. It will be appreciated that, alternatively, the buses 311, 312, and 326–340, can be replaced by fewer buses or a single bus by utilizing techniques well known in the art.

Figure 9:
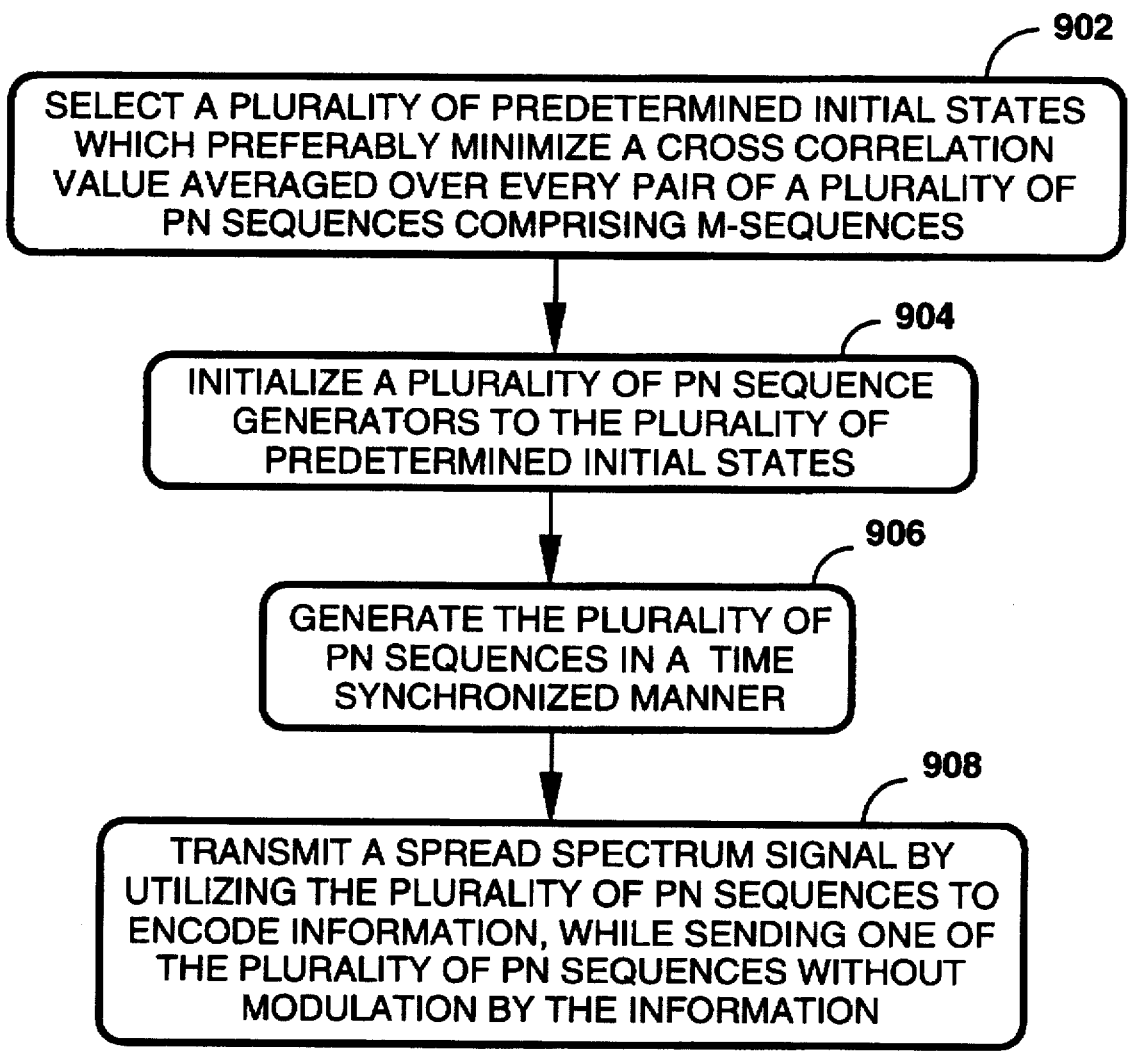
FIG. 9 is a flow chart of a method for transmitting information in a spread spectrum signal in accordance with the present invention.

FIG. 9 is a flow chart of a method for transmitting information in a spread spectrum signal in accordance with the present invention. The flow chart begins with the processor 802 selecting 902 a plurality of predetermined initial states for the m-sequence generators 302, 306, 320 of the transmitter 800. The plurality of predetermined initial states preferably are ones that minimizes a cross-correlation value averaged over every pair of the plurality of transmitted PN sequences (preferably, m-sequences) to be generated by the m-sequence generators 302, 306, 320. Then the processor 802 initializes 904 the m-sequence generators 302, 306, 320 to the plurality of predetermined initial states. The processor 802 then generates 906 the plurality of transmitted PN sequences in a time-synchronized manner by supplying a common clock signal to the m-sequence generators 302, 306, 320. The transmitter back end 300 then transmits 908 a spread spectrum signal by utilizing the plurality of transmitted PN sequences to encode information. Preferably, one of the plurality of transmitted PN sequences is sent without modulation by the information in order to facilitate acquisition and tracking of the PN sequences.

Figure 10:
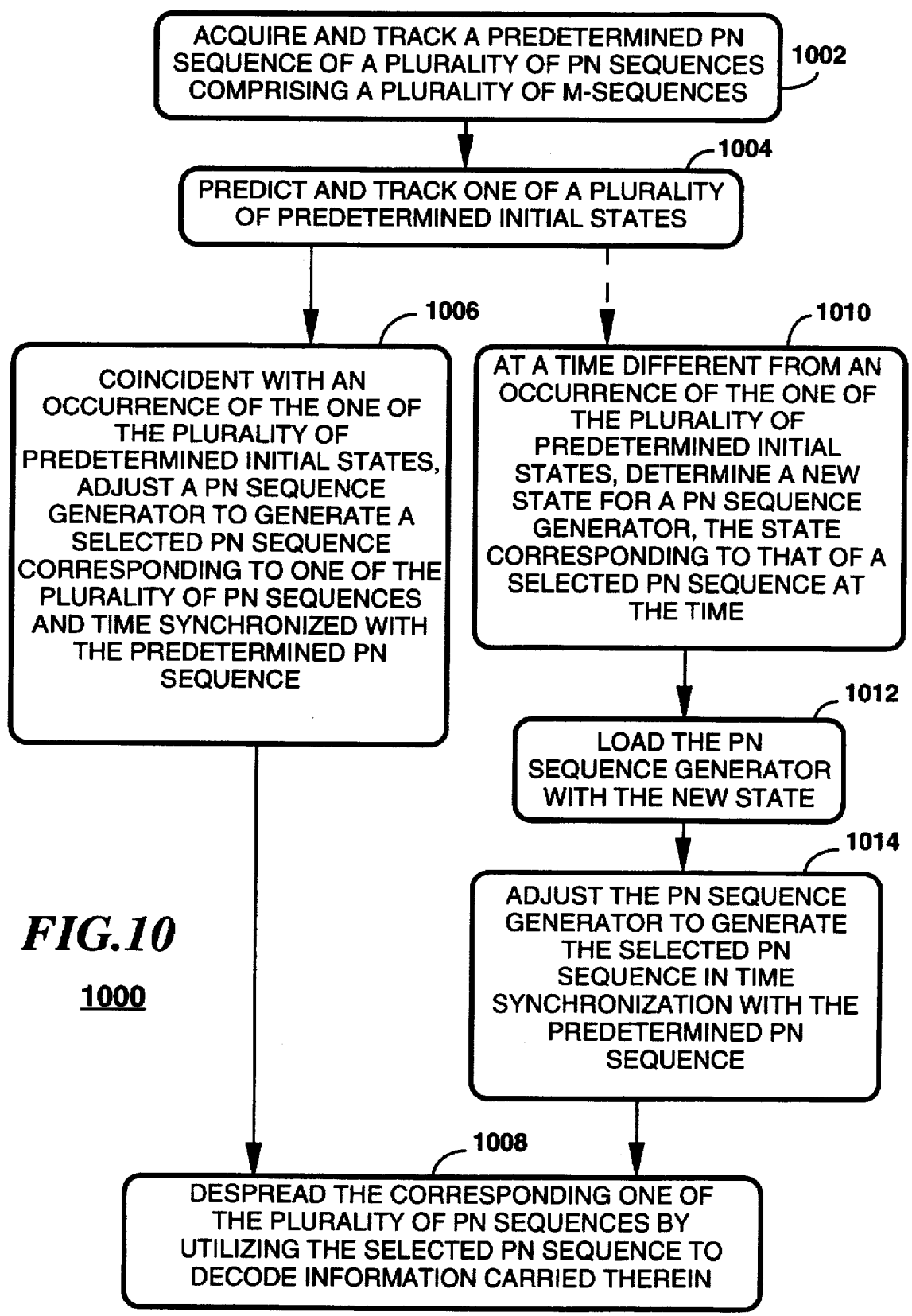
FIG. 10 is a flow chart of a method for receiving information in a spread spectrum signal in accordance with the present invention.

FIG. 10 is a flow chart of a method for receiving information in a spread spectrum signal in accordance with the present invention. The flow chart begins with the receiver 600, 700 acquiring and tracking 1002 a predetermined PN sequence of the plurality of transmitted PN sequences (preferably, m-sequences). Then the processor 616, 712 predicts and tracks 1004 one of the plurality of predetermined initial states as described herein above. Then, coincident with an occurrence of the one of the plurality of predetermined initial states, the processor 616, 712 adjusts 1006 the feedback configuration of a PN sequence generator to generate a selected PN sequence corresponding to one of the plurality of transmitted PN sequences and time-synchronized with the predetermined PN sequence. Depending upon the arrangement of the m-sequences selected for the system, as will be discussed further below, the processor 616, 712 can also load new contents into the modular shift register 100 of the PN sequence generator. The receiver 600, 700 then despreads 1008 the corresponding one of the plurality of transmitted PN sequences by utilizing the selected PN sequence to decode information carried in the selected PN sequence.

Alternatively, following step 1004, at a time different from an occurrence of the one of the plurality of predetermined initial states, the processor 616, 712 can determine a new state for a PN sequence generator 608, 714, 722, 730, the new state corresponding to that of a selected PN sequence at the time. The processor 616, 712 then loads 1012 the PN sequence generator 608, 714, 722, 730 with the new state. The processor also adjusts 1014 feedback configuration of the PN sequence generator 608, 714, 722, 730 to generate the selected PN sequence in time synchronization with the predetermined PN sequence. Flow then proceeds to step 1008 to despread the signal.

FIG. 11 is a table that depicts a first arrangement of the m-sequences in accordance with the present invention. In this arrangement all of the m sequences are constrained to have the same initial conditions. In this example, a PN code of length 31 is used for illustrative purposes. Here the binary contents, $C^i(k)$, of six five-bit shift registers is given in octal notation. The initial conditions are arbitrarily set to 37 wherein the shift registers are initialized with all one's at time k=0.

If the transmitter 800 is constrained such that all m-sequences have the same initial condition, then transitions from one m-sequence to another require additional calculations to change the m-sequence at other than the beginning of the sequence, i.e. when k=0, as described above.

Additionally, when the shift registers are constrained to have the same initial conditions, the cross correlation performance of the m-sequences is limited to levels achieved by the restricted subset of possible initial conditions. More flexibility in choosing the initial conditions can help in achieving the best cross correlation performance possible over a set including all possible initial conditions of the m-sequences.

With slight modifications, the restriction that all m-sequences have the same initial condition need not be applied. What is required is that the relative position of the m-sequences of the transmitter 800 be known so that it can be replicated in the receiver 600, 700. Each m-sequence in the transmitter 800 can have a different initial condition as long as that initial condition is known to the receiver 600, 700. Since the m-sequences are deterministic, then more generally, the locally generated m-sequence shift register can be monitored until a predetermined state is detected, at which time the feedback taps can be changed to generate a different m-sequence, concurrent with a replication of the appropriate initial condition in the receiver 600, 700 which is predetermined from the known relative position of the m-sequences in the transmitter 800.

FIG. 12 depicts another arrangement of the contents of the transmitter shift registers 100 for the same m-sequences as previously shown in FIG. 11. FIG. 12 differs from FIG. 11 in that the restriction that the initial conditions be the same is not imposed. Again, the example code length is 31 and the binary contents, $C^i(k)$, of the six shift registers is given in octal notation. The initial conditions are set to $C^0(0)=23$, $C^1(0)=21$, $C^2(0)=1$, $C^3(0)=17$, $C^4(0)=10$, and $C^5(0)=4$.

Given that the initial conditions, $C^j(0)$, are known, consider the m-sequence corresponding to $j=0$, for example, as applied to the shift register of the m-sequence generator 608 of FIG. 6. If it is desired to switch to the m-sequence corresponding to $j=2$, then the contents of the shift register are monitored until the contents equal 23, at which time the taps are changed from $t^0$ to $t^2$ and concurrently, the contents of the shift register are changed from 23 to 1. Later, if the m-sequence is to be changed to that corresponding to $j=5$ so as to despread data stream 5, then the contents of the shift register are monitored until the contents equal 1, at which time the taps are changed from $t^2$ to $t^5$ and concurrently, the contents of the shift register are changed from 1 to 4. In this example, as in the example of FIG. 11, the changes occur at the beginning of the code sequence. The difference is that the initial conditions of the m-sequences in the transmitter 800 are not constrained to be equal, and that the contents of the shift registers must be changed in addition to changing the taps. An advantage achieved by not constraining the initial conditions to be equal is full freedom to select any initial conditions possible to optimize some system performance parameter such as cross correlation.

As a second example in connection with FIG. 12, it is assumed that the contents of the transmitter shift registers 100 are known for $k=8$, $k=16$, and $k=24$, in addition to the initial conditions at time $k=0$. Now consider the m-sequence corresponding to $j=0$, for example. If it is desired to switch to the m-sequence corresponding to $j=2$, then the contents of the shift register are monitored until the contents equal 23, 10, 27, or 3, whichever occurs first. Assuming for example that a content equal to 10 is first detected, then the taps are changed from $t^0$ to $t^2$ and concurrently, the contents of the shift register are changed from 10 to 23. Later, if the m-sequence is to be changed to that corresponding to $j=5$ so as to despread data stream 5, then the contents of the shift register are monitored until the contents equal 1, 23, 16, or 13 whichever occurs first. Assuming for example that the contents reach 16 first, then the taps are changed from $t^2$ to $t^5$ and concurrently, the contents of the shift register are changed from 16 to 24. In like manner, the taps can be changed during any of the times at which the shift register contents are known.

This second example advantageously reduces the calculations required to change the m-sequence by making use of a lookup table. It should be apparent that the time taken to change the m-sequence can be reduced further if the receiver 600, 700 stores more information of the transmitter generator contents. At one extreme, the receiver 600, 700 can have knowledge of the contents of the shift registers 100 for all values of k, thereby allowing changing the m-sequence at any time.

FIG. 13 is presented to illustrate a third example arrangement of m-sequences in which the initial conditions are not required to be equal and in which the contents of the shift registers need not be changed to change the m-sequence. This third example is not as flexible as that of the second example in which the shift register contents are also changed, but the receiver 600, 700 hardware advantageously can be made somewhat less complex. The same initial conditions as shown in FIG. 12 are shown in FIG. 13. FIG. 13, however, highlights regions in which the contents of the shift registers for different values of j are the same at the same given values of k. For this example, the contents of the shift registers for $j=1$ and $j=2$ are both equal to 3 at time $k=1$. Consequently, the feedback taps can be changed from $t^1$ to $t^2$ upon detection of a shift register content equal to 3 without changing the contents of the shift register. As an example, a single channel in the receiver 600, 700 can despread data streams . . . 0, 1, 2, 3, 4, 5, 0, 1, . . . in cyclic order in the following manner. Beginning with the m-sequence for $j=0$, the shift register is monitored until the contents equal 7, at which time the tap feedback configuration is changed from $t^0$ to $t^1$. At a later time, the shift register is monitored until the contents equal 6, for example, at which time the tap feedback configuration is changed from $t^1$ to $t^2$. Still later, the taps are changed from $t^2$ to $t^3$ when the shift register contents equal 23, and then later from $t^3$ to $t^4$ when the shift register contents equal 1. In like manner, the taps change from $t^4$ to $t^5$ when the shift register contents equal 17, and from $t^5$ back to $t^0$ when the shift register contents equal 25. It will be appreciated by one of ordinary skill in the art that many other variations in the arrangement of the m-sequences can be made in accordance with the present invention, depending upon desired system objectives.

Thus, it should be apparent by now that the present invention provides a method and apparatus for transmitting and receiving information in a multi-channel spread spectrum signal which does not require expensive multiple acquisition and tracking loops. The method and apparatus advantageously can simultaneously decode multiple parallel time-synchronized PN sequences by utilizing only a single acquisition and tracking loop.

What is claimed is:

1. A method for transmitting and receiving information in a spread spectrum signal in a data communication system, the method comprising at a transmitter the steps of:

initializing a plurality of pseudonoise (PN) sequence generators to a plurality of predetermined initial states;

thereafter generating a plurality of transmit PN sequences that are time-synchronized with one another by the plurality of PN sequence generators; and transmitting the spread spectrum signal by utilizing the plurality of transmit PN sequences to encode the information; and the method further comprising at a receiver the steps of:

acquiring and tracking a predetermined one of the plurality of transmit PN sequences;

predicting and tracking a selected one of the plurality of predetermined initial states;

adjusting a PN sequence generator to generate a selected PN sequence corresponding to one of the plurality of transmit PN sequences and time-synchronized with the predetermined one of the plurality of transmit PN sequences; and despreading the corresponding one of the plurality of transmit PN sequences by utilizing the selected PN sequence to decode the information.

2. The method of claim 1, wherein the initializing step comprises the step of loading the plurality of PN sequence generators with identical initial states.

3. The method of claim 1, wherein the initializing step comprises the step of loading the plurality of PN sequence generators with initial states that are not all identical with one another.

4. The method of claim 1, wherein the adjusting step occurs coincident with an occurrence of the selected one of the plurality of predetermined initial states.

5. The method of claim 1, wherein the adjusting step occurs at a time coincident with a first set of states in the PN sequence generator, the first set of states at said time being identical to a second set of states in one of the plurality of PN sequence generators that is generating the selected PN sequence.

6. The method of claim 1,
   wherein the adjusting step occurs at a time different from that of an occurrence of the selected one of the plurality of predetermined initial states, and
   wherein the adjusting step comprises the steps of:
      determining a new state for the PN sequence generator corresponding to the selected PN sequence at said time; and
      loading the PN sequence generator with the new state.

7. The method of claim 1, wherein the adjusting step comprises the step of changing a feedback configuration of the PN sequence generator.

8. The method of claim 1, wherein the adjusting step comprises the step of loading a predetermined set of states into the PN sequence generator.

9. The method of claim 1, wherein the transmitting step comprises the step of
   sending one of the plurality of transmit PN sequences without modulation by the information.

10. The method of claim 1, wherein the initializing step comprises the step of
    selecting the plurality of predetermined initial states in a manner that minimizes a cross correlation value averaged over every pair of the plurality of transmit PN sequences.

11. The method of claim 1, wherein the plurality of transmit PN sequences comprise a plurality of maximal length linear shift register sequences (m-sequences).

12. The method of claim 1, wherein the adjusting step comprises the step of
    adjusting a plurality of PN sequence generators to simultaneously generate a plurality of selected PN sequences corresponding to ones of the plurality of transmit PN sequences and time-synchronized with the predetermined one of the plurality of transmit PN sequences, and
   wherein the despreading step comprises the step of
    simultaneously despreading the corresponding ones of the plurality of transmit PN sequences by utilizing the plurality of selected PN sequences to decode the information.

13. A transmitter for transmitting information as a spread spectrum signal in a data communication system, the transmitter comprising:
    an input interface for receiving a message including the information to be transmit;
    a processor coupled to the input interface for processing the information;
    a plurality of pseudonoise (PN) sequence generators coupled to the processor for being initialized thereby to a plurality of predetermined initial states, wherein the processor controls the plurality of PN sequence generators to generate a plurality of transmit PN sequences that are time-synchronized with one another; and
    at least one radio frequency (RF) modulator for transmitting the spread spectrum signal after the plurality of transmit PN sequences are utilized to encode the information.

14. The transmitter of claim 13, wherein the processor is programmed to transmit one of the plurality of transmit PN sequences without modulation by the information.

15. The transmitter of claim 13, wherein the processor is programmed to select the plurality of predetermined initial states in a manner that minimizes a cross correlation value averaged over every pair of the plurality of transmit PN sequences.

16. The transmitter of claim 13, wherein the plurality of transmit PN sequences comprise a plurality of maximal length linear shift register sequences (m-sequences).

17. A receiver for receiving information in a spread spectrum signal in a data communication system, the receiver comprising:
    an acquisition and tracking element for acquiring and tracking a predetermined one of a plurality of transmit PN sequences that are time-synchronized with one another;
    a processor coupled to the acquisition and tracking element for predicting and tracking one of a plurality of predetermined initial states and for adjusting a first PN sequence generator to generate a selected PN sequence corresponding to one of the plurality of transmit PN sequences other than the predetermined one and time-synchronized with the predetermined one; and
    the first PN sequence generator coupled to the processor for despreading the corresponding one of the plurality of transmit PN sequences by utilizing the selected PN sequence to decode the information.

18. The receiver of claim 17, wherein the processor is programmed to adjust the first PN sequence generator coincident with an occurrence of the one of the plurality of predetermined initial states.

19. The receiver of claim 17,
    wherein the processor is programmed to:
       adjust the first PN sequence generator at a time different from that of an occurrence of the one of the plurality of predetermined initial states;
       determine a new state for the first PN sequence generator corresponding to the selected PN sequence at said time; and
       load the first PN sequence generator with the new state.

20. The receiver of claim 17, wherein the processor is programmed to change a feedback configuration of the first PN sequence generator.

21. The receiver of claim 17, wherein the processor is programmed to load the first PN sequence generator with another predetermined initial state that corresponds to the selected PN sequence to be generated.

22. The receiver of claim 17, further comprising a second PN sequence generator for cooperating with the acquisition and tracking element to acquire and track the predetermined one of the plurality of transmit PN sequences, wherein the processor adjusts the first PN sequence generator coincident with an occurrence of identical states in the first and second PN sequence generators.

23. The receiver of claim 17, wherein the plurality of transmit PN sequences comprise a plurality of maximal length linear shift register sequences (m-sequences).

24. A receiver for receiving information in a spread spectrum signal in a data communication system, the receiver comprising:
    an acquisition and tracking element for acquiring and tracking a predetermined one of a plurality of transmit PN sequences that are time-synchronized with one another;
    a processor coupled to the acquisition and tracking element for predicting and tracking one of a plurality of predetermined initial states and for adjusting a plurality of PN sequence generators to simultaneously generate a plurality of selected PN sequences corresponding to ones of the plurality of transmit PN sequences and time-synchronized with the predetermined one; and
    the plurality of PN sequence generators coupled to the processor for simultaneously despreading the corresponding ones of the plurality of transmit PN sequences by utilizing the plurality of selected PN sequences to decode the information.

* * * * *